(No Model.)
O. H. & W. M. JEWELL.
CONTROLLING DEVICE.
No. 577,685. Patented Feb. 23, 1897.
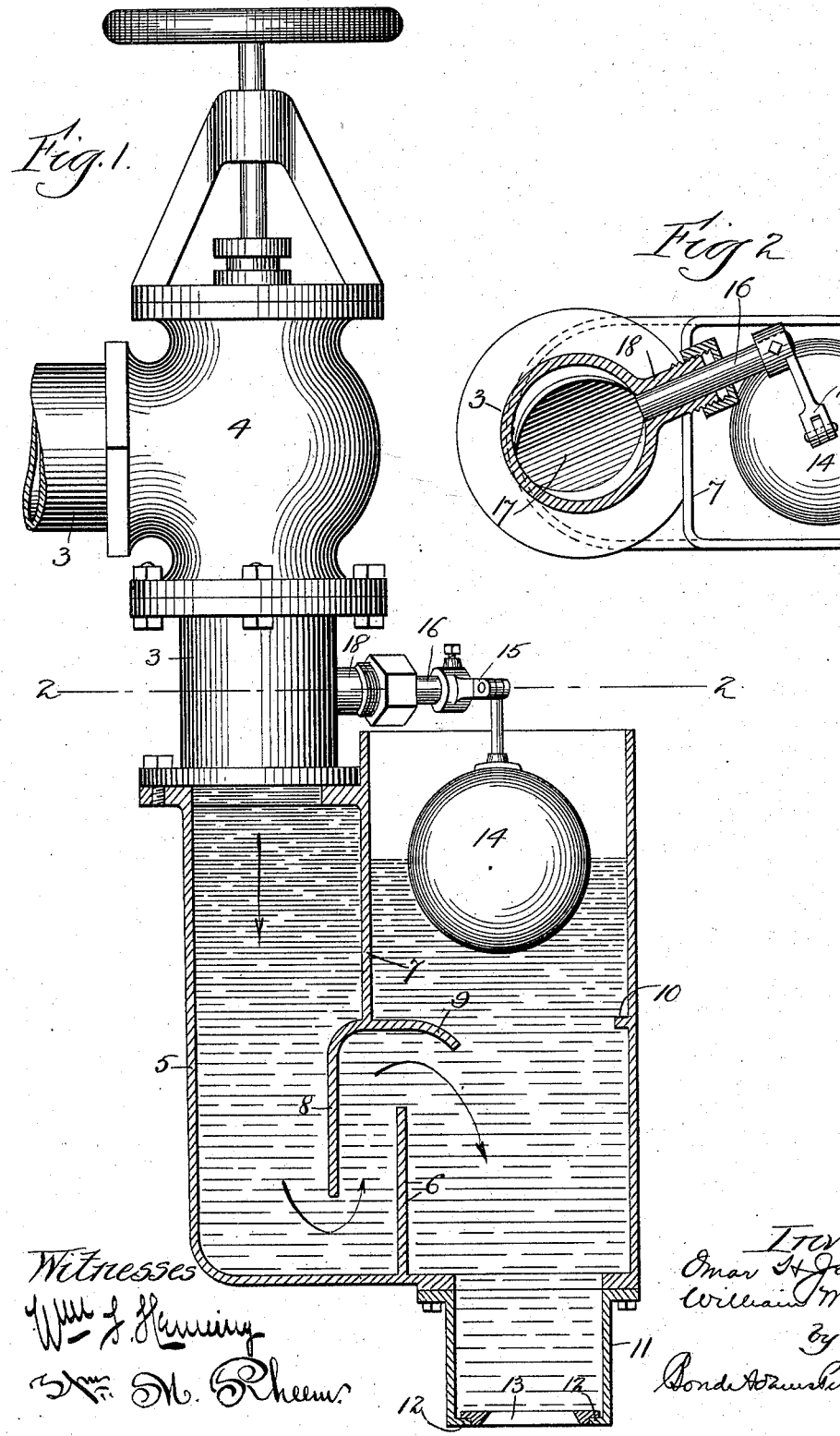

UNITED STATES PATENT OFFICE.

OMAR H. JEWELL AND WILLIAM M. JEWELL, OF CHICAGO, ILLINOIS, ASSIGNORS TO THE O. H. JEWELL FILTER COMPANY, OF SAME PLACE.

CONTROLLING DEVICE.

SPECIFICATION forming part of Letters Patent No. 577,685, dated February 23, 1897.

Application filed May 16, 1896. Serial No. 591,812. (No model.)

*To all whom it may concern:*

Be it known that we, OMAR H. JEWELL and WILLIAM M. JEWELL, citizens of the United States, residing at Chicago, in the county of Cook and State of Illinois, have invented certain new and useful Improvements in Controlling Devices, of which the following is a specification, reference being had to the accompanying drawings, in which—

Figure 1 is a side elevation, partly in section; and Fig. 2 is a cross-section on line 2 2 of Fig. 1, showing the valve.

Our invention relates to devices adapted to regulate the flow of water or other liquids, and has particularly for its object to provide an improved controlling device which will be adapted to be used in connection with filters for regulating the supply of water. We accomplish this object as hereinafter specified and as illustrated in the drawings.

That which we regard as new will be set forth in the claims.

In the drawings, 3 indicates a pure-water pipe having a valve 4 for opening or closing it. 5 indicates a tank or receptacle into which the water is discharged from the pipe 3, said tank having in it partitions 6 7, forming a trap, as shown in Fig. 1. The lower end of the partition 7 is bifurcated, having a downwardly-extending portion 8 and a curved portion 9, forming a deflector over the top of the partition 6, as shown in Fig. 1.

10 indicates a lug formed in the wall of the tank 5 opposite the deflector 9.

11 indicates a discharge-passage having an annular shoulder 12.

13 indicates a removable ring which is adapted to fit into the discharge-passage 11 and rest upon the shoulder 12. Inasmuch as the water flows through the ring 13, by removing the ring and replacing it with another having a passage of greater or less diameter the size of the discharge-orifice may be varied as desired.

As best shown in Fig. 1, above the deflector 9 the tank 5 is open, and in the upper portion of said tank is suspended a float 14, which is connected by an arm 15 to the stem 16 of the butterfly-valve 17, said stem being journaled in a bearing 18, projecting from the pipe 3. The arrangement is such that by raising and lowering the float 14 the butterfly-valve 17 may be rocked to open or close the water-passage of the pipe 3.

The operation of the controller is as follows: Water flowing through the pipe 3 passes through the trap and out through the discharge-ring 13. Should the water flow into the box 5 faster than it can escape, back pressure will result, thereby filling the box 5 above the deflector 9 and causing the float 14 to rise, thereby swinging the butterfly-valve 17 and partially closing the passage of the pipe 3 and reducing the flow of water. This action continues until the flow of water into the box 5 equals the discharge, when the float 14 will remain in a stationary position. Should the flow of water into the box 5 increase or decrease, the float 14 will be automatically moved correspondingly, thereby adjusting the valve 17 to properly regulate the flow.

It will be understood, of course, that the controller is set for a given discharge by fitting in the discharge-passage 11 a ring 13 of the proper size. When removing and replacing the rings 13, the float 14 is thrown up out of the box 5, when access may readily be had to the interior of the discharge-passage 11.

The trap formed by the partitions 6 7 maintains that part of the liquid which supports the float in a quiet condition, as otherwise the float would be agitated, and consequently the flow of the liquid would not be smooth. The deflector or trap serves to direct the flowing liquid away from that portion immediately around the float, as indicated by the arrows. The lug 10, in connection with the deflector 9, operates to form a support for a perforated plate which may be inserted in the tank beneath the float and operates to further protect the float from agitation by the flowing liquid.

We have described in detail the construction of our improved controlling devices, but we do not limit ourselves to such specific details, as they may be varied without departing from the spirit of our invention.

That which we claim as our invention, and desire to secure by Letters Patent, is—

1. In a controller for regulating the flow of liquids, the combination with a liquid-conduit and a valve in said conduit, of a tank into which the liquid is continuously discharged from said conduit, an outlet for said tank, a removable ring in said outlet for controlling the continuous discharge from the tank, and a float arranged in said tank and connected to the stem of said valve for automatically operating the latter to regulate the volume of liquid which flows through said conduit, substantially as described.

2. In a controller for regulating the flow of liquids, the combination with a pipe and a valve therein, of a tank communicating at its upper end with said pipe and provided at its lower end with an outlet, the vertical partitions 6 and 7 arranged in said tank and separated at their adjacent ends, the downwardly-depending plate 8 and horizontal curved deflector 9, and a float arranged in the tank above the deflector and connected to the stem of said float, substantially as described.

3. In a controller for regulating the flow of liquids, the combination with a pipe, and a valve therein, of a tank having a partition 7 and a deflecting-plate 9, a partition 6, a lug 10 opposite the deflecting-plate 9, and a float in said tank connected with the valve, substantially as described and for the purpose specified.

OMAR H. JEWELL.
WILLIAM M. JEWELL.

Witnesses:
JOHN L. JACKSON,
ALBERT H. ADAMS.